US009838065B2

(12) United States Patent
Higgins et al.

(10) Patent No.: US 9,838,065 B2
(45) Date of Patent: Dec. 5, 2017

(54) METHODS AND SYSTEMS FOR HIGH CAPACITY WIRELESS BROADBAND DELIVERY

(71) Applicant: Digital Path, Inc., Chico, CA (US)

(72) Inventors: James A. Higgins, Chico, CA (US); Brock Eastman, Chico, CA (US)

(73) Assignee: East West Bank, El Monte, CA (US)

( * ) Notice: Subject to any disclaimer, the term of this patent is extended or adjusted under 35 U.S.C. 154(b) by 96 days.

(21) Appl. No.: 14/050,960

(22) Filed: Oct. 10, 2013

(65) Prior Publication Data

US 2014/0106686 A1 Apr. 17, 2014

Related U.S. Application Data

(60) Provisional application No. 61/713,362, filed on Oct. 12, 2012.

(51) Int. Cl.
| | |
|---|---|
| *H04B 1/44* | (2006.01) |
| *H04B 1/40* | (2015.01) |
| *H04L 5/14* | (2006.01) |
| *H04L 5/16* | (2006.01) |
| H04B 7/0413 | (2017.01) |
| H04L 1/16 | (2006.01) |
| H04W 52/08 | (2009.01) |
| H04W 52/14 | (2009.01) |
| H04W 52/24 | (2009.01) |

(52) U.S. Cl.
CPC .............. *H04B 1/40* (2013.01); *H04L 5/14* (2013.01); *H04L 5/16* (2013.01); *H04B 7/0413* (2013.01); *H04L 1/1607* (2013.01); *H04W 52/08* (2013.01); *H04W 52/146* (2013.01); *H04W 52/245* (2013.01)

(58) Field of Classification Search
CPC ............ H04B 1/44; H04B 1/48; H04B 1/525
USPC .......................................................... 455/78
See application file for complete search history.

(56) References Cited

U.S. PATENT DOCUMENTS

| | | | | |
|---|---|---|---|---|
| 7,349,371 | B2* | 3/2008 | Schein | H04W 74/006 370/329 |
| 7,466,985 | B1* | 12/2008 | Handforth | H04W 72/08 370/312 |
| 7,630,346 | B2* | 12/2009 | Schein | H04W 48/12 370/329 |
| 8,089,925 | B1* | 1/2012 | Uhlik | H04W 48/12 370/310 |

(Continued)

OTHER PUBLICATIONS

International Search Report and Written Opinion dated Jul. 18, 2014.

*Primary Examiner* — April G Gonzales
(74) *Attorney, Agent, or Firm* — FisherBroyles, LLP; Rob L. Phillips

(57) ABSTRACT

System enhancement(s) are disclosed that can add capabilities, such as, using Frequency Division Multiple Access (FDMA) and/or Time Division Multiple Access (TDMA) and/or Frequency Division Duplex (FDD) capabilities along with Multi-Input Multi-Output (MIMO) antennas and/or Global Positioning System (GPS) synchronization. The use of two radios in both the base-station and the subscriber-station, i.e., customer premises equipment (CPE), e.g., can allow frequency division to be utilized, exploiting higher receive gains at the CPE while not affecting transmissions occurring on the other radio's frequency.

49 Claims, 7 Drawing Sheets

(56) References Cited

U.S. PATENT DOCUMENTS

| | | | | |
|---|---|---|---|---|
| 8,229,362 B2* | 7/2012 | Hariharan | H04W 72/082 | 455/63.1 |
| 8,918,135 B2* | 12/2014 | Park | H04W 52/146 | 370/252 |
| 2007/0105592 A1* | 5/2007 | Kang | H04W 48/08 | 455/561 |
| 2007/0264935 A1* | 11/2007 | Mohebbi | H04B 7/15542 | 455/41.2 |
| 2007/0268846 A1* | 11/2007 | Proctor | H04B 7/15535 | 370/279 |
| 2008/0298450 A1* | 12/2008 | Zhang | H04L 1/0006 | 375/227 |
| 2009/0190500 A1* | 7/2009 | Ji | H04W 36/0083 | 370/254 |
| 2010/0135238 A1* | 6/2010 | Sadri | H04W 72/0453 | 370/329 |
| 2010/0265913 A1* | 10/2010 | Gorokhov | H04W 36/0055 | 370/331 |
| 2010/0267386 A1* | 10/2010 | Lim | H04W 36/385 | 455/436 |
| 2010/0278100 A1* | 11/2010 | West | H04W 52/245 | 370/328 |
| 2012/0069746 A1* | 3/2012 | Park | H04W 72/082 | 370/252 |
| 2012/0082040 A1* | 4/2012 | Gong | H04W 74/0816 | 370/252 |
| 2012/0257585 A1* | 10/2012 | Sydor | H04W 72/082 | 370/329 |
| 2012/0257654 A1* | 10/2012 | Gilberton | H04W 72/1215 | 375/219 |
| 2014/0307704 A1* | 10/2014 | Arogyaswami | H04B 7/0413 | 370/330 |
| 2014/0314032 A1* | 10/2014 | Kim | H04W 16/14 | 370/329 |

* cited by examiner

METHODS AND SYSTEMS FOR HIGH CAPACITY WIRELESS BROADBAND DELIVERY

CROSS-REFERENCE

This application claims the benefit of U.S. Provisional Application No. 61/713,362, filed Oct. 12, 2012, entitled Methods and Systems for High Capacity Wireless Broadband Delivery, which application is incorporated herein by reference.

BACKGROUND

Conventional Wireless Internet Access Systems lack the ability to provide high speed data rates at distance due to protocols used, regulatory agency restrictions and the capabilities of existing equipment on the market. Regulatory agencies impose transmitter power restrictions on certain unlicensed frequency bands. These limits decrease receive signal levels (signal strength at the receiver), shortening the distance at which a wireless link can sustain higher data rates and increased raw link throughput. For example, in the United States, the unlicensed 5 GHz UNII-2 & UNII-2e radio bands are considered "low power" frequency bands and the UNII-3/ISM radio band is considered a "high power" frequency band. Limited spectrum in the more desirable high power frequency bands leads to congestion and local interference problems at transmission sites.

Current protocols used by Wireless Internet Access Systems require the acknowledgement of a packet before the next packet is sent. Acknowledgements are critical to determine what data rate packets can be successfully transmitted and received at reliably. If a packet is not acknowledged as being received, it has to be retransmitted. As distance increases, this method of packet transmission limits potential data transfer rates because of the time it takes to receive, acknowledge and, if necessary, retransmit a packet before the next packet in the queue can be transmitted. Traditionally, point to multipoint systems utilize a single radio on a single frequency alternating between transmit and receive cycles (Half Duplex). This reduces hardware costs and provides basic broadband services but is very inefficient since the radio has to transmit and then receive instead of continuously transmitting and receiving at the same time (Full Duplex). While standard 2×2 MIMO solutions utilize both a vertical and a horizontal chain, performance at distance is still limited due to the use of only a single radio on each side of a wireless link in a Half Duplex configuration.

SUMMARY

In an embodiment, system enhancement(s) according to aspects of embodiments of the disclosed subject matter can add capabilities, such as, using Frequency Division Multiple Access (FDMA) and/or Time Division Multiple Access (TDMA) and/or Frequency Division Duplex (FDD) capabilities along with Multi-Input Multi-Output (MIMO) antennas and/or Global Positioning System (GPS) synchronization. As an option of this system, the use of two radios in both the base-station and the subscriber-station, i.e., customer premise equipment (CPE), e.g., can allow frequency division to be utilized, exploiting higher receive gains at the CPE while not affecting transmissions occurring on the other radio's frequency.

An aspect of the disclosure is directed to a system that incorporates CPEs connected to base-stations located both on towers (Macro Cells) and/or rooftops (Pico Cells). The system may incorporate one or more of TDMA, FDMA, and GPS synchronization pulses to provide precision timing where each base-station coordinates transmit and receive cycles with other base-stations at the same location and/or other locations to reduce interference and promote frequency re-use.

In an embodiment, frequency re-use can be highly utilized in the downstream transmit direction from base-stations to CPEs as general customer usage patterns require asymmetric speeds (more downloading than uploading) for multi-media broadband delivery such as Internet Protocol television (IPTV), Voice over Internet Protocol (VoIP), and general data service. A 20 MHz wide channel in the base-station to CPE transmit direction can be re-used 2 times at a Macro Cell or Pico Cell assuming each base-station has less than a 180 degree coverage beam width, as is discussed below, e.g., regarding FIGS. 1 and 2.

An aspect of the disclosure is directed to the use of unlicensed 5 GHz radio bands. There is nearly 500 MHz of available spectrum providing an aggregate capacity for customer downloads of over 2 GB/s per Macro Cell if, e.g., all downlink and uplink channels are utilized when using conventional 802.11n MIMO radios. The upstream direction from CPE to base-station can be more efficient by, e.g., narrowing channel widths to minimize interference and maximize channel use at the base-station.

An additional aspect of the disclosure is directed to drastically reducing low throughput resulting from acknowledgement air delays between the base-station and CPE, e.g., when utilizing Frequency Division Duplex. This is a technique where one frequency band is used to transmit and another is used to receive.

Another aspect of the disclosure is directed to utilizing Full Duplex, retransmissions of packets, in the event of a dropped packet, that can be, e.g., simply resent on the transmission cycle, eliminating normal Half Duplex acknowledgement air delays. Acknowledgements can be received by a non-transmitting radio on both base-station and CPE to ensure response time remains fairly consistent. This can allow, e.g., better support of enterprise grade VoIP services with high Mean Opinion Scores (MOS) which measure voice call quality.

Still another aspect of the disclosure is directed to the base-station and CPE, e.g., utilizing at least a 2×2 MIMO, incorporating a minimum of two streams in the CPE. Or, as an option, incorporating additional receive gain on the base-station, which can be achieved by using an additional antenna, i.e., a 2×3 MIMO, and receive chains. This could allow for the receive signal strength to be drastically increased, supporting greater distances between a CPE and base-station in the low power frequency bands. These optional additions could potentially increase signal by 7-12 dBm in a 2×3 MIMO configuration when compared to a single stream solution and more than doubles the potential link distance compared to standard 2×2 MIMO solutions. This also allows for long range connectivity from base-station to base-station and base-station to CPE using low power frequency bands generally thought unusable beyond 5-7 miles due to the imposed regulatory transmit power limitations. By combining 2×2 or 2×3 MIMO with FDMA and a high gain CPE antenna, even low power frequency bands can obtain around a 30+ mile base-station to CPE link.

A subscriber station apparatus and method is disclosed which may comprise an antenna; a first radio connected to the antenna transmitting data or acknowledgements in a high equivalent isotropically radiated power regulated frequency band; and a second radio connected to the antenna receiving data or acknowledgements in a low equivalent isotropically radiated power regulated frequency band. The subscriber station may also comprise a media access controller preventing the subscriber station device from transmitting data or acknowledgements whenever the subscriber station device is receiving data or acknowledgements. The subscriber station may also comprise a filter on the receiving radio of the subscriber station device filtering out the frequency at which the subscriber station device is transmitting data or acknowledgements. The radios may have multiple input and multiple output capabilities. The media access controller may adjust subscriber station transmit power according to information received from the base station.

The subscriber station device may comprise a media access controller configured to set the subscriber station transmit and receive channel widths, independently of each other. The media access controller may utilize a plurality of pre-determined transmit and receive windows established for the media access controller to define a respective time when the subscriber station device is permitted to transmit, which is exclusive of any pre-determined receive time when the subscriber station device is permitted to receive. The plurality of pre-determined transmit and receive windows may be determined from information received from a base-station in communication with the subscriber station and may be determined by a base-station in communication with the subscriber station, and may be based on a time standard periodically supplied to the base station device.

The disclosed apparatus and method may comprise a base-station device which may comprise an antenna; a first radio connected to the antenna transmitting data and acknowledgements in a low equivalent isotropically radiated power regulated frequency band; and a second radio connected to the antenna receiving data and acknowledgements in a high equivalent isotropically radiated power regulated frequency band. The base-station may comprise a media access controller preventing the base-station device from transmitting data or acknowledgements to a CPE whenever the base-station device is receiving data or acknowledgements from the same CPE. The base station may comprise a filter on the receiving radio of the base-station device filtering out the frequency at which the base-station device is transmitting data or acknowledgements. The base-station radios may have multiple input and multiple output capabilities.

The media access controller may be configured to provide information to a subscriber station for adjusting the subscriber station transmit power. The media access controller may be configured to set the base-station transmit and receive channel widths independently of each other. The media access controller may be configured to create a plurality of pre-determined transmit and receive windows. The plurality of pre-determined transmit and receive windows may be based on a time standard periodically received by the base-station device. The second radio may receive a signal from a customer premise equipment transmitter transmitting in the high equivalent isotropically radiated power regulated frequency band.

A tangible machine readable medium is disclosed that may store instructions that, when executed by a computing device, may cause the computing device to perform a method of operating a subscriber station device, which method may comprise controlling a first radio connected to an antenna in the subscriber station to transmit data or acknowledgements in a high equivalent isotropically radiated power regulated frequency band; and controlling a second radio connected to the antenna in the subscriber station to receive data or acknowledgements in a low equivalent isotropically radiated power regulated frequency band. A tangible machine readable medium is disclosed that may store instructions that, when executed by a computing device, cause the computing device to perform a method of operating a base-station device, which method may comprise controlling a first radio in the base-station to transmit data or acknowledgements in a low equivalent isotropically radiated power regulated frequency band; and controlling a second radio in the base station to receive data or acknowledgements in a high equivalent isotropically radiated power regulated frequency band.

A tangible machine readable medium is disclosed that may store instructions that, when executed by a computing device, cause the computing device to perform a method, which method may comprise transmitting data or acknowledgements by a first radio in a low equivalent isotropically radiated power regulated frequency band; and receiving data or acknowledgements by a second radio in a high equivalent isotropically radiated power regulated frequency band, or which method may comprise receiving data or acknowledgements by a first radio in a low equivalent isotropically radiated power regulated frequency band; and transmitting data or acknowledgements by a second radio in a high equivalent isotropically radiated power regulated frequency band.

INCORPORATION BY REFERENCE

All publications, patents, and patent applications mentioned in this specification are herein incorporated by reference to the same extent as if each individual publication, patent, or patent application was specifically and individually indicated to be incorporated by reference. See, for example, U.S. Pat. No. 6,831,921, entitled "Wireless Internet Access System".

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Tri-Sector Design

Currently, standard MIMO outdoor base-stations utilize a 2×2 (2 transmit, 2 receive chains) MIMO radio chip along with a dual polarity (vertical & horizontal) antenna. This setup only utilizes 1 vertical and 1 horizontal chain as well as combining a portion of the receive signal between the two chains.

Figure 2:
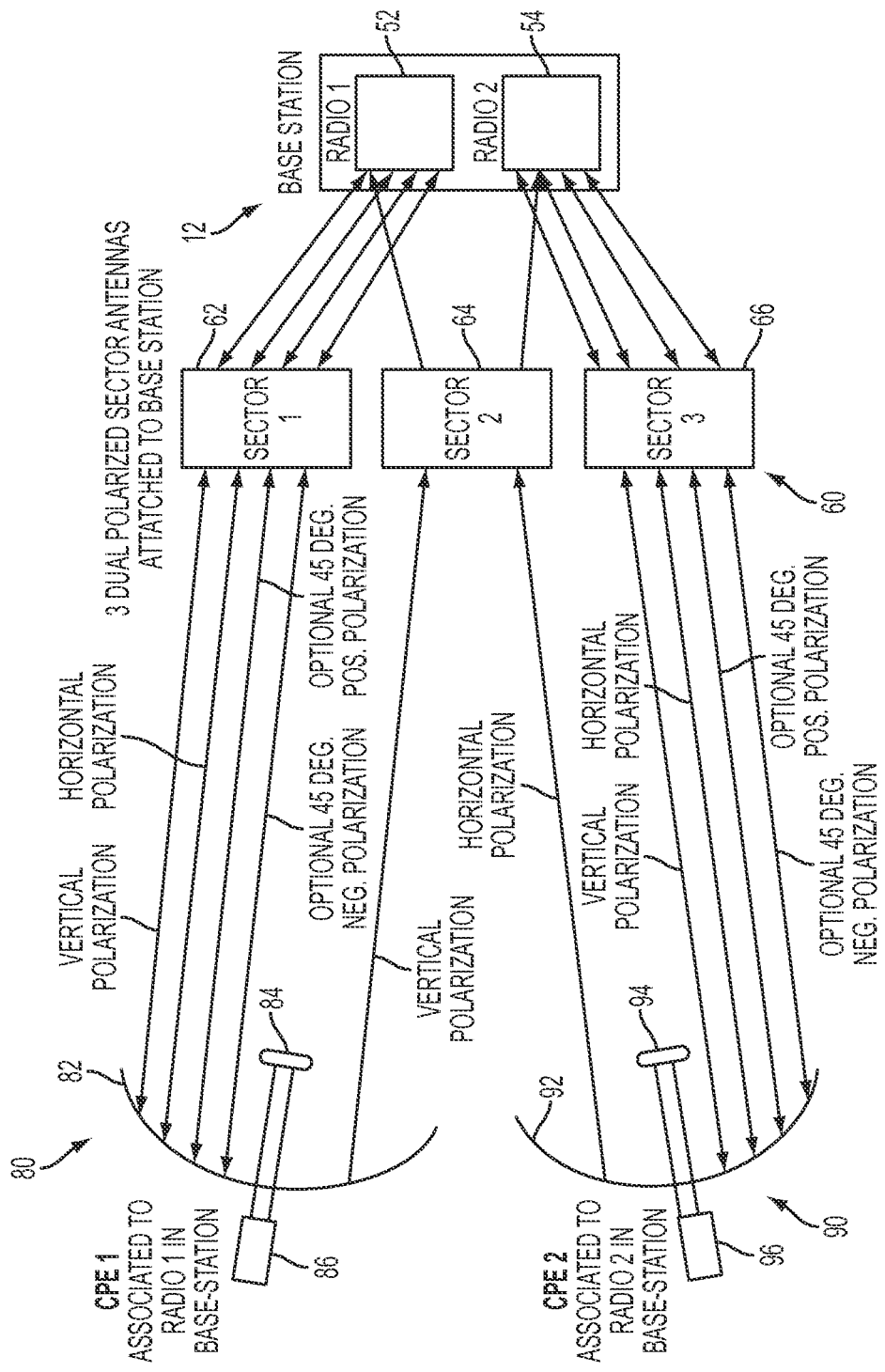
FIG. 2 illustrates, schematically and partly in block diagram format, a base-station utilizing a 2×3 MIMO multi-sectored antenna, e.g., for communication with a pair of CPEs each utilizing a 2×2 MIMO antenna, according to aspects of embodiments of the disclosed subject matter.

In an embodiment of the disclosure base-stations may optionally utilize 2×3 (2 transmit, 3 receive chains) MIMO radio chips that provide additional receive signal gain over conventional 2×2 MIMO systems, as discussed in further detail with respect to FIG. 2. The system can, e.g., still only transmit in two streams, but the radios in the base-stations can utilize a third receive chain, e.g., one radio using the vertical and the other using the horizontal polarization of the additional antenna. This does not create additional interference between the two radios in the base-station because the particular chains can be set to receive only. Adding an optional third receive chain to the base-station achieves up to a 5 dBm receive signal gain increase not including the gain benefits 2×2 MIMO provides via multiple receive signal chain combination and spatial diversity. By utilizing various combinations of these options, this base-station can achieve lower packet error rates at better overall power reception at the receiver, e.g., as measured by a received signal strength indicator (RSSI) value, increasing the potential link distance between the base-station and CPE. Historically the CPE to base-station (return link) is more stressed due to increased adjacent radio interference and co-channel interference at Macro Cell sites, e.g., from other local radios. The added receive signal level gain, according to aspects of an embodiment of the disclosed subject matter of the present system can greatly improve link quality at greater distance as well as improve packet error rates at lower signal to noise ratios, as further discussed in this application.

Antenna De-Icing System

Conventional antenna systems can be subject to extreme winter weather conditions and, therefore, can suffer signal degradation caused by ice buildup. If ice is allowed to develop, partial or complete signal loss can occur.

In a possible embodiment of the disclosed subject matter, the system may optionally be configured to include an automatic deicing system (not shown). The deicing system may include an active heating element (not shown) on the face of the antenna and a 24-48 volt DC power supply (not shown). The de-icing system could activate when temperature, and/or icing, and/or moisture sensors are triggered, indicating an ice buildup event. Once an icing event message is received by the base-station, power may be sent to the active heating element, melting ice and restoring the signal. The base-station may have a separate connection for the power cable connecting the 24-48 volt DC power supply to an active heating element inside the base-station or it may utilize power directly from the base-station.

GPS Synchronization Per Device

In conventional GPS synchronized systems, a single GPS host device provides timing for multiple base-stations via cables connecting the GPS host to each base-station. If there is RF energy from third party transmitters, such as local FM broadcasts, this RF energy can enter the cables connecting the GPS host to the base-stations and generate false pulses or completely prevent a valid GPS pulse from ever reaching the base-station.

In some configurations, each base-station, as an option, may be equipped with its own GPS receiver, e.g., to synchronize transmit and receive timing cycles between the two radios inside the base-station as well as other base-stations at the same macro cell and even other macro or pico cells throughout the network, reducing interference between transmit and receive radios. This optional synchronization could occur once every second, synchronizing sub-microsecond system interrupt timers in each base-station throughout the network, as is discussed in more detail, e.g., with respect to FIG. 4. Without interconnecting pulse cables between individual base-stations to pick up unwanted RF energy thus reducing the creation of false pulses or the blocking of the pulse altogether.

Clear Channel Assessment

In conventional 2×2 MIMO base-stations, Clear Channel Assessment (CCA) is utilized. This function makes the radios listen to see if their respective operating channels are already in use by another radio, and causes the radios to delay transmitting if CCA detects that the channel is currently busy with other traffic. This delays the data packet being transmitted for a random amount of time or delays transmission completely, forcing the system to, e.g., wait until the next available time slot to transmit the packet, which slows down the potential data transfer rate through the wireless link.

The system of the present application can be configured to allow base-station transmitter coordination using GPS timing and/or by completely disabling CCA which can ensure immediate packet transmission based on preset timing slots. In the event a local regulatory agency requires CCA to be enabled, the base-station radio may detect that the channel is already utilized prior to transmitting and it can defer transmission to the next transmit slot, allowing other third party transmitters time to transmit while still maintaining synchronization with other radios in base-stations at the same and/or adjacent cells. As an option, if a base-station radio detects that the channel is already utilized prior to transmitting, it can defer transmission by a certain interval, coordinating the time delay interval with the other radio in the same base-station as well as radios in other base-stations at the macro cell and adjacent macro or pico cells to keep the entire system synchronized.

Radio/Antenna Cluster—

Conventional radio/antenna clusters have high power signals that can overwhelm conventional RF filtering when multiple transmitters are located very close together causing local baseband, adjacent and co-channel interference problems such as with commodity 802.11n radio chip hardware.

In an embodiment of the disclosed subject matter the use of even/odd timing can allow each base-station to have its own GPS receiver to coordinate packet transmits and receives. Pico cell base-stations can be connected wirelessly in a serial fashion. Every "odd" pico cell can transmit packets upstream and downstream at the same time internal, while every "even" pico cell can receive packets from upstream and downstream during this same time interval. This packet transmission timing can alternate between the "even" and the "odd" pico cells to ensure that every transmitter located at each pico cell will transmit and receive packets on the same time schedule as is illustrated in more detail with respect to FIG. 4. When a CPE is wirelessly connected to a macro or pico cell, the CPE can follow the same odd/even timing protocol. Both transmit and receive packet time slots may be equal, allowing for continuous transmitting and receiving of packets through many pico cells that are wirelessly connected together.

Frequency Re-Use—

In conventional MIMO technologies, radios in base-stations do not coordinate transmit and receive window timing with other base-stations. Base-stations transmitting on the same or adjacent channels cause themselves and each other adjacent base station co-channel interference. When the radios interfere with each other, they are forced to transmit at lower data rates and/or back off transmitting, which decreases throughput. Conventional MIMO radios located closely to one another may be forced to operate in channels whose center frequencies are not the same or adjacent to each other, which in addition to the above, leads to poor spectral efficiency especially when there are multiple users at a macro cell.

In an embodiment, as an option, the disclosed subject matter may allow for coordinating all transmitters, e.g., using GPS synchronization in and between each base-station, thereby allowing for frequency re-use by reducing adjacent and co-channel interference. As long as two or more base-station antennas cannot see the same CPE or the CPE cannot see more than one base-station, frequency re-use can be utilized on both the transmit and receive channels as demonstrated by way of example in regard to FIG. 1. As another option, hardware filter(s) in the base-stations may be utilized to filter the base-station's transmitter's frequency band from its receiver's frequency band. This can, e.g., prevent a base-station's transmitter from overloading its receiver and/or other receivers within the same receive frequency band, allowing the base-station to transmit and receive simultaneously without interfering with itself and/or other base-stations nearby. By implementing this in all base-stations at a macro or pico cell, this can prevent interference from the transmit frequency band to the receive frequency band in a base-station as well as interference between base-stations.

Half Duplex Air Delay Fixed

Half duplex wireless links can require an acknowledgement after every packet is sent before the radio can send the next packet. In long range wireless links, the air time delay between base-station to CPE or base-station to base-station can substantially reduce overall throughput when each packet has to wait for an acknowledgement before it is transmitted or be retransmitted later, which increases latency.

In at least some embodiments, the system of the present application can be configured to route the acknowledgments through the return link using multiple access modulation techniques as discussed in the present application, e.g., using FDMA or frequency division duplexing FDD. This can, e.g., allow the transmit link to continuously transmit, or transmit as often as local regulatory authority allows for the given frequency to be utilized, without having to stop transmitting and listen for the acknowledgment. If a packet acknowledgment is not received on the return link, the transmit link can, e.g., immediately re-send the packet. This can, e.g., allow for the same throughput and latency at different distances because the radio does not have to wait for the acknowledgment in order to continue transmitting, with, e.g., variable air delay varying with distance. In traditional wireless technology, every packet sent across a wireless link is followed up by a "packet received" acknowledgement. If the acknowledgement is not received in a given time frame, the packet has to be re-sent. Since every packet is being acknowledged, one after another, minimal buffering is traditionally utilized. This causes fluctuation in packet arrival times because acknowledgements sometimes arrive, but sometimes are not received at all, causing dropped packets that need to be retransmitted. This fluctuation increases jitter and degrades voice over Internet protocol (VOIP) quality. Further, acknowledging every packet adds additional time to each packet transmit/receive cycle, slowing potential link throughput. Another currently implemented conventional option is to not use acknowledgements at all and guess the data rate a wireless link can sustain without loss of packets. This method requires running at lower data rates and/or lower modulations, in order to ensure reliable packet transmission, and provide no packet delivery assurance.

In still other aspects of the disclosed subject matter, the system of the present application can be configurable to add a packet delay buffer to store a set number of packets based on a set time frame for the storage. The delay buffer can be implementable in both the transmit and receive cycles, as discussed in regard to FIG. 5. In the transmit cycle, a copy of the packet will be kept for the delay buffer time period, e.g., sufficiently to ensure immediate packet retransmission, if required, e.g., if an acknowledgement is not timely received. In the receive cycle, each packet may be held for the delay buffer time period, e.g., sufficiently to allow a missing packet, subsequently received to be inserted in the correct order in the receive buffer. Once a packet has been stored, e.g., in the transmission packet delay buffer for a time period equal to the designated receive buffer time, i.e., not having yet been acknowledged, it can immediately and automatically be sent out to its next destination. Packets can be numbered in a sequential order. This can allow dropped packets to be retransmitted, received and then placed back in the correct order before going out to their next destination, which can include actual utilization when the reception is at the destination CPE, thereby minimizing delay variations. The system may, in some configurations, according to aspects of the disclosed subject matter, utilize packet acknowledgement on a per packet basis, incorporating the delay buffer, as noted, allowing packets to be retransmitted and then reordered while still continuing to receive additional packets. As another option, instead of acknowledging every packet as received, the system may not address received packets, but only address dropped packets. When a packet is determined to have been dropped, a "no packet received" message can be sent with the packet number and that packet can then, e.g., be removed from the transmission packet delay buffer and automatically retransmitted. Packet success and failure status can thus be recorded and transmit data rate control can be utilized, e.g., to adjust automatically to ensure future high data packet delivery rates. The dropped packet retransmission cycle time, according to aspects of the disclosed subject matter, may be less than the overall delay buffer time based on, e.g., the wait and see requirements of a receiver.

Lone Range Low Power

Depending on the local regulatory authority, certain frequency bands can be restricted to certain output power limitations. This can, e.g., reduce the potential useable wireless link distance due to being forced to utilize these low power frequency bands. Other frequency bands may have significantly higher output power limitations. The local regulatory authority ordinarily limits the output power combined with the transmission antenna gain, i.e., equivalent isotropically radiated power (EIRP), however, only for transmitting. The antenna receive gain is not calculated in the overall transmit power limit.

In at least some configurations, the system according to aspects of the disclosed subject matter, may use techniques for, e.g., keeping the transmit link in the low power frequency band (low EIRP), e.g., by combining techniques, such as, frequency division and a high gain directional antenna for the CPE, that can allow for the frequency of, e.g., the base-station transmit link to be in a low power frequency band (low EIRP) because the high gain of the CPE's directional antenna can act to increase the overall signal strength as seen at the CPE, even in the low EIRP frequency band. As an example, the CPE transmit link can utilize the high power frequency band (high EIRP) thereby overall allowing for the achievement of substantially longer distance stable wireless links while remaining within regulatory requirements (EIRP for both the base-station and CPE transmitters will not exceed the regulatory EIRP limits). In addition, other techniques may be combined to improve the base-station receive signal, e.g., by having a high CPE EIRP (the CPE transmit power combined with the high gain directional antenna), helping to overcome any outside interference at the base-station location. Further, as an option, in certain aspects of the disclosed subject matter, e.g., in FDMA mode, the base-station's transmit and receive frequency channel widths can be set independently of each other, e.g., based on demand. For example, the base-station's transmitters channel width can be set to 20 MHz while the base-station's receivers channel width could be set to 5 or 10 MHz, as discussed in more detail with respect to FIG. 6.

TDMA Timing for CPE Transmit in FDMA Mode

Currently, when packets from multiple CPEs arrive at a base-station simultaneously, packet collisions occur. This can cause packets to have to be retransmitted, degrading the wireless link throughput.

In at least some configurations, the system of the present application can be configurable such that, e.g., it can reduce packet collisions at the base-station receiver caused by packets from several CPEs arriving simultaneously. The base-station may receive a GPS pulse every second from a GPS receiver at the base-station. When each pulse is received by the base-station, the system of the present application may synchronize (update) its interrupt timer(s), e.g., to control transmit and receive timing. The CPE, e.g., may then receive synchronized (updated) timing coordination for its transmit window(s) from the base-station, e.g., based on the transmit window(s) of other CPEs and/or based on whether packets are currently being received that are destined to the CPE. If, as an example, the CPE is or will be receiving packets, it may delay packet transmission until a designated data packet receive window is complete in order to reduce potential interference between the CPE transmitter and receiver. As an example, the base-station may send out its transmit destination and transmit time(s) immediately before sending data, allowing each CPE to know if packets are destined for the respective CPE and how much time the transmit window(s) will take in order, e.g., for the CPE to determine when to transmit and, e.g., for how long, without reception interference occurring at the CPE. Otherwise, as an example, the CPE could be in a situation where it is attempting to transmit and receive packets simultaneously on its transmitter and receiver, potentially causing itself to drop a packet(s).

TDMA Timing

In traditional TDMA systems, a fixed amount of overall cycle time is allocated to transmitting (transmit window) while the remaining cycle time is allocated to receiving (receive window) regardless of whether there are enough CPEs transmitting and/or receiving to efficiently utilize all of the time allocated to each cycle's transmit and receive windows. In the transmit window, multiple CPEs may receive data from the base station, e.g., in a chronological order with no consideration for acknowledgements. This means the base station needs to transmit at a lower data rate to ensure packets arrive since there is no retry mechanism or acknowledgements. Also, as more CPEs are connected to the base station, more CPE receive slots need to be allocated within any given cycle, which impacts the upload transmission data rate. This fixed cycle configuration is also accompanied by high latency because the transmit and receive windows cannot adjust themselves according to the current transmit and receive demands on the base-station. With this additional latency, the system could easily exceed 20 milliseconds per radio link.

In an embodiment, according to the subject matter of this application, by drastically shortening overall cycle times and, e.g., transmitting to only one receiver, e.g., at a CPE, in a given allocated transmit window, overall latency can be reduced substantially. Transmit timing for packets may also be varied based on individual packet size with smaller packets being transmitted later in the overall transmit portion of the cycle, making possible all base-stations finishing the overall transmit cycle at the same time, regardless of packet size. Because of the synchronized transmit timing based on packet size, all of the acknowledgements should arrive at the base-station simultaneously, e.g., at the very beginning of the receive cycle/window. This can allow for acknowledgements to be processed in real time. Data rates may also be adjusted, e.g., for the next successive overall transmit and/or receive cycle, according to the success of previous packet delivery, as determined by the acknowledgements or lack thereof of "no packet received" acknowledgements. This allows for the highest possible transmission data rates to be utilized, with the least amount of errors. In the event of a dropped packet, the data can be resent in the next transmit cycle or immediately retransmitted in the current receive cycle/window which maintains superior link quality.

In an embodiment, as an example of aspects of the disclosed subject matter, base-station to base-station or base-station to CPE wireless links may utilize the same frequency for upload and download. In this configuration, both base-station to base-station and base-station to CPE(s) may have coordinated transmit and receive windows. The GPS signal sends a pulse every second, with sub-microsecond accuracy, to each base-station. When each pulse is received by the base-station, e.g., system interrupt timers may be synchronized to control transmit and receive timing. Recipients, such as CPEs may receive timing instructions from the transmitter, e.g., the base-station and coordinate transmit and receive timing windows based on instructions from the transmitter, e.g., the base-station. Each individual recipient, e.g., a CPE may have an assigned transmit window to notify the base-station, e.g., that the CPE has information to send. The CPE may wait to transmit data until the base-station authorizes it to transmit at a specific time and for a specific duration.

In an embodiment, as an option, in either FDMA or TDMA mode, the base-station may also query all connected recipients, e.g., CPEs that are not already authorized to transmit packets, in order to see if, e.g., any additional CPEs have data packets to transmit. After each such query, the base-station could determine, e.g., which connected CPEs requested transmit time slots, then designate in what order those CPEs would be allocated their respective transmit time slot(s). If a CPE no longer has packets to transmit and stops transmitting, its designated time slot(s) may be reallocated to other CPEs requesting to transmit data packets. As an option, by way of example, the system of the present application may provide that, if, e.g., a CPE just received a data packet from the base-station, its transmit time slot may follow immediately after, allowing the CPE to transmit back to the base-station.

CPE—No Tx when Rx from Base-Station or Filter

Figure 7:
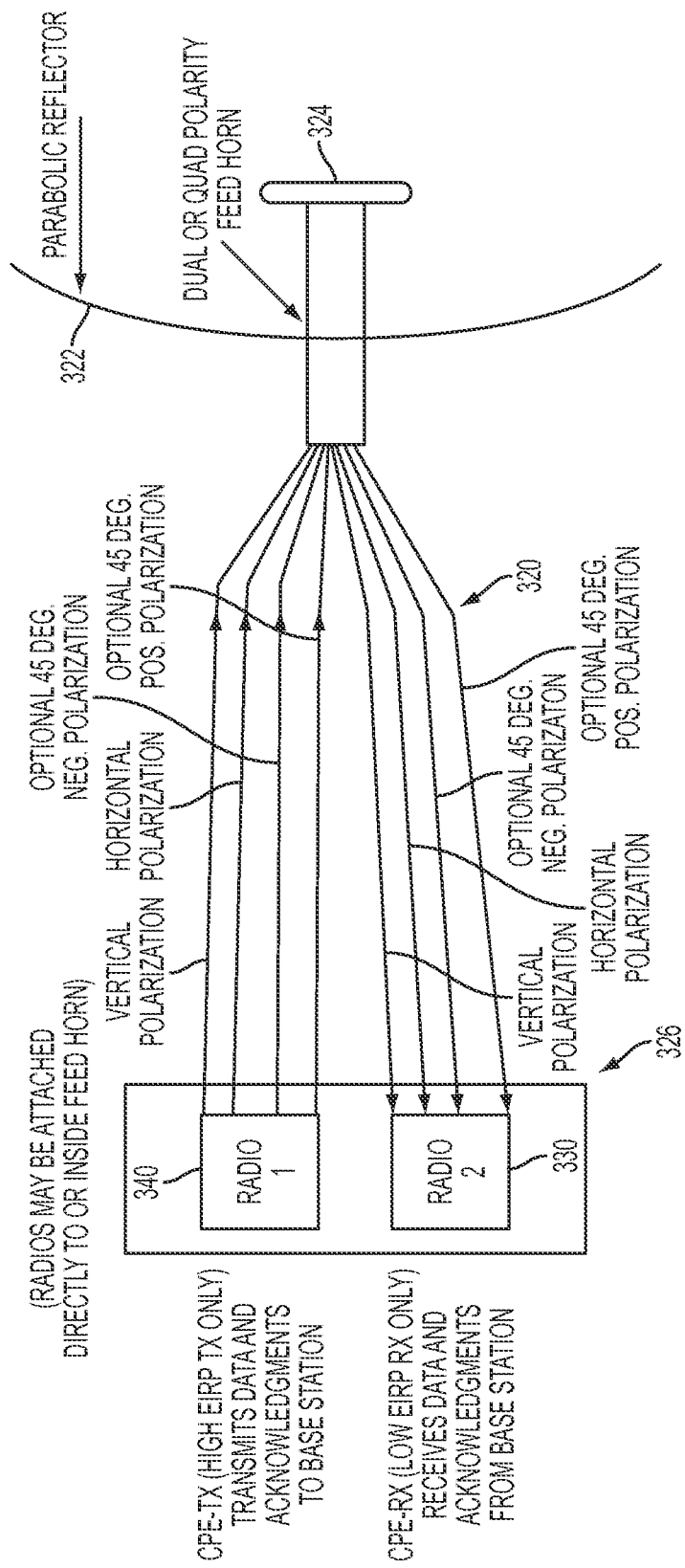
FIG. 7 illustrates, schematically and partly in block diagram format, the signal polarization and radio configuration of a CPE device, according to aspects of embodiments of the disclosed subject matter.

In an embodiment, e.g., in order to minimize interference at the transmitting unit's receiver, e.g., between the base-stations' or the CPE's transmitter and receiver, e.g., when frequency division is implemented, an additional filter could be placed on the receiving units, e.g., the CPE's, receiver to filter out the transmit frequency as discussed in more detail with respect to FIG. 7. As another option, e.g., the CPE transmitter could be timed to transmit only if the CPE is not receiving packets, e.g., destined to the CPE at the time.

Spatial Separation/Filter on Base-Station

In an embodiment, in order to minimize interference, e.g., when frequency division is implemented, between the base-station transmitter and receiver, filtering could be done on the receiver to filter out the transmitter's frequency, e.g., with a filter or filters placed on the receiver. As another option, e.g., in addition to integrated sector antennas, or transmit and receive antennas located in close proximity to each other, e.g. within a few feet of each other, the base-station's transmit antenna could be spatially separated from the base-station's receive antenna by, e.g., extending either antenna's cabling. Another option is to have the receiver in a different base-station located elsewhere at the macro or pico cell, while still coordinating with the transmit base-station over Ethernet or some other communications protocol. This can reduce the chances of the transmitter overwhelming the front end of the receiver.

Figure 1:
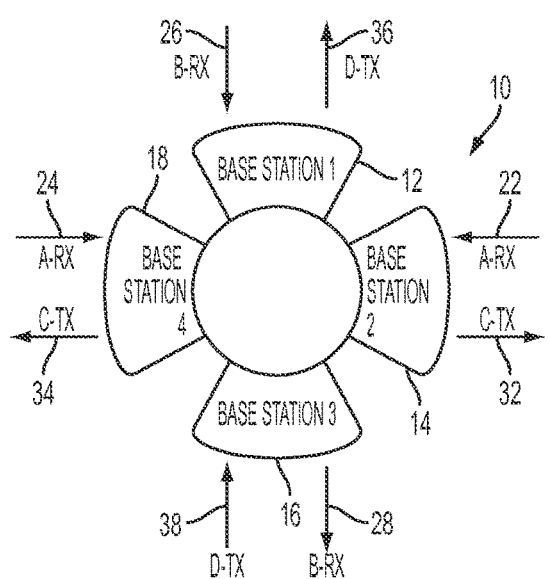
FIG. 1 illustrates, schematically and partly in block diagram format, that base-stations oriented 180 degrees apart from each other may be able to transmit (TX) and receive (RX) on the same channel, according to aspects of embodiments of the disclosed subject matter.

Turning now to FIG. 1, there is illustrated by way of example a macro-cell or pico-cell 10, schematically and partly in block diagram format, whereby, e.g., base-stations oriented 180 degrees apart from each other may be able to transmit (TX) and receive (RX) on the same channel, e.g., at the same common center frequency, according to aspects of embodiments of the disclosed subject matter. The macro-cell or pico-cell 10 may include a base-station 1, 12, a base-station 2, 14, a base station 3, 16 and a base-station 4, 18. The sectored transmission and receive antennas forming the base stations 12, 14, 16 and 18, as discussed in further detail below, may have a base-station 2 receive channel A, 22, an oppositely directed base station 4 receive channel A, 24, a base-station 1 receive channel B, 26, an oppositely directed base station 3 receive channel B, 28, a base-station 2 transmit channel C, 32, an oppositely directed base station 4 transmit channel C, 34, a base-station 1 transmit channel D, 36 and an oppositely directed base-station 3 transmit channel D, 38.

As illustrated, by way of example, base-stations oriented 180 degrees apart from each other can be able to transmit (TX) and receive (RX) on the same channels. FIG. 1 shows 4 channels labeled A-D. Channels A and C being utilized by opposing base-stations 1 and 3, with sectored antennas, as discussed more with respect to, e.g., FIG. 2, facing 180 degrees apart, while channels B and D can be utilized by base-stations 2 and 4, also with antennas facing 180 degrees apart. As noted in the present application, e.g., using GPS and transmit synchronization, etc., allows all base-station transmission and receiver radios to transmit (TX) at the same time and then receive (RX) at the same time, e.g., with at least limited interference because of the spatial/directional positioning of the antennas, thus also providing better spectral efficiency, e.g., reducing adjacent and co-channel interference.

Turning now to FIG. 2 there is illustrated, schematically and partly in block diagram format, a base-station utilizing a 2×3 MIMO antenna and radio configuration, e.g., for communication with, e.g., a pair of CPEs each utilizing a 2×2 MIMO antenna and radio configuration, according to aspects of embodiments of the disclosed subject matter. FIG. 2 shows, by way of example, how two different CPEs 80, 90 can connect to two different radios 52, 54 inside a single base-station 12. CPE 1, 80, can connect to radio 1, 52, and CPE 2, 90 can connect to radio 2, 54 in the base station 12. Radio 1, 52, and Radio 2, 54, in the base-station 12 can coordinate their transmission/receive timing cycles, e.g., using Time Division Multiple Access (TDMA) to prevent baseband and co-channel interference between each other and other base-stations, which can, e.g., increase packet transfer reliability and efficiency.

FIG. 2 shows, by way of example, a base-station 12, including a Radio 1, 52 and a Radio 2, 54, which may be connected in 2×3 MIMO format to a MIMO antenna array 60 comprising three dual polarity sector antennas 62, 64, 66, attached to the base-station 12. The Radio 1, 52, as illustrated, may transmit and receive through the sector 62 and the Radio 2, 54, may transmit and receive through the sector 66. CPE 1, 80, may receive from and transmit to the base station 12 through the sector 62, e.g., utilizing, e.g., four polarization schemes, e.g., vertical and horizontal polarization and optional 45° positive polarization and optional 45° negative polarization. The CPE 2, 90, can do the same through sector 66 of the MIMO antenna 60 at the base station 12. Each CPE, 80, 90, may have a parabolic dish, 82 and 92, respectively, a reflector 84, 94, respectively, and a radio 86, 96, respectively.

FIG. 2 also shows, by way of example, how two different CPEs, e.g., 80, 90, can connect to two different radios, e.g., Radio 1, 52, and Radio 2, 54, inside a single base-station 12. CPE 1, 80, can connect to Radio 1, 52 and CPE 2, 90, can connect to Radio 2, each through a sector, respectively 62, 66 of the MIMO antenna array 60. Radio 1, 52, and Radio 2, 54, in the base-station 12 can coordinate their transmission/receive timing cycles, e.g., using time division multiple access (TDMA), e.g., in order to prevent baseband and co-channel interference between each other and/or other base-stations in the area, which can, e.g., increase packet transfer reliability and efficiency. It can also be seen in FIG. 2 how each CPE can also transmit to the radios 52, 54 in the base station 12, through the third receive only sector 64 of the 2×3 MIMO antenna array 60, e.g., each using a different polarization, e.g., vertical and horizontal, respectively, which can increase the overall reception signal strength at the respective radio 52, 54, at the base station 12 in communication with the respective CPE 80, 90, as noted elsewhere in the present application.

Figure 3:
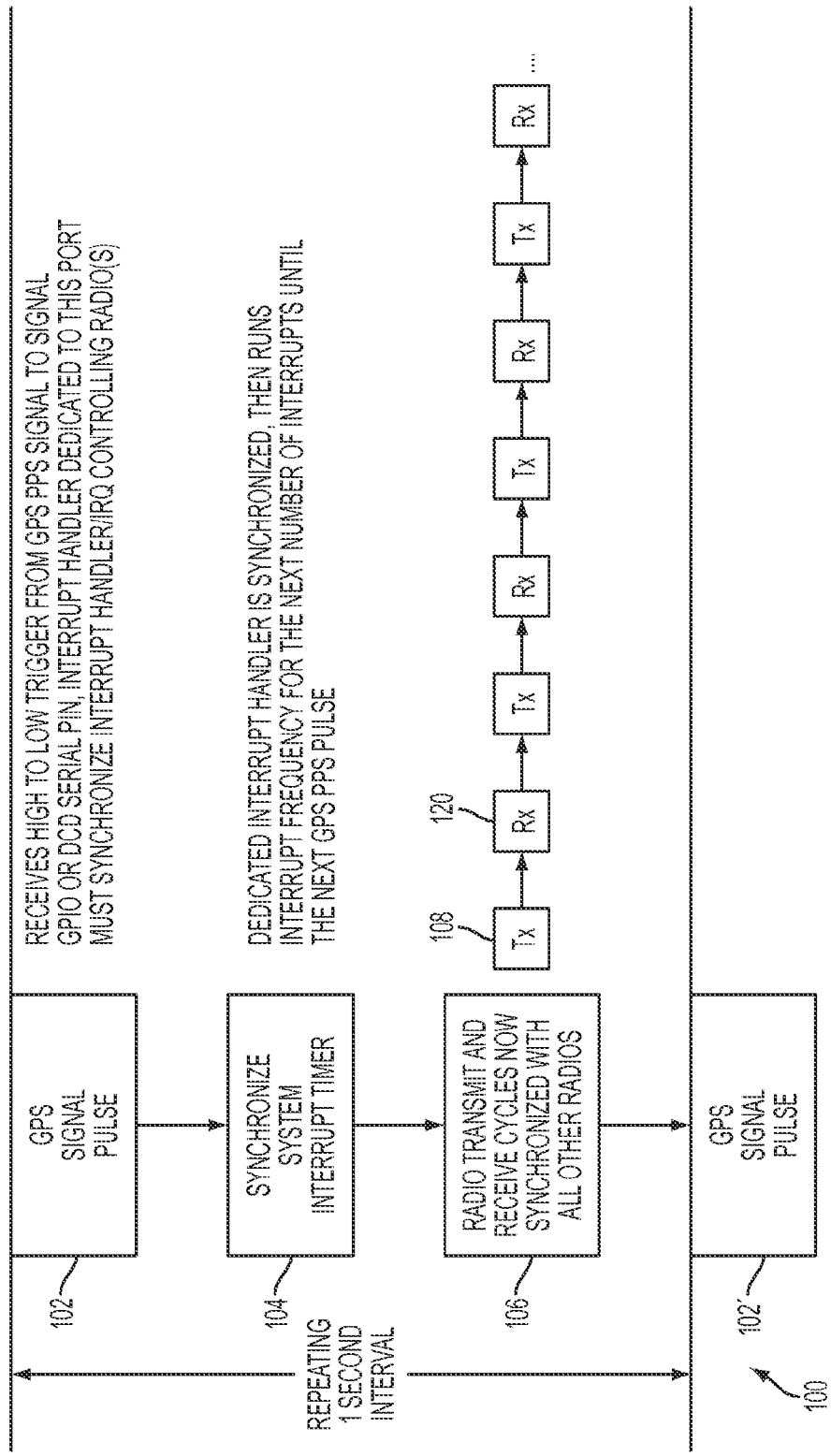
FIG. 3 illustrates, schematically and partly in block diagram format, how a system according to aspects of the disclosure may utilize a GPS pulse received by a base-station, allowing a system interrupt timer to synchronize multiple transmit (Tx) and receive (Rx) time slots, according to aspects of embodiments of the disclosed subject matter.

FIG. 3 illustrates, schematically and partly in block diagram format, how a system according to aspects of the disclosure may utilize a GPS pulse received by a base-station, allowing a system interrupt timer to synchronize multiple transmit (TX) and receive (RX) time slots, according to aspects of embodiments of the disclosed subject matter. Within the base station, by way of example, a geographic positioning system (GPS) timing pulse. As an example, the system can receive and determine a high to low trigger from the GPS pulse per second (PPS) signal, which may be used to signal, e.g., a general purpose input/output (GPIO) or data carrier detect (DCD), or the like, serial pin connected, e.g., to an interrupt handler dedicated to a port at such an I/O pin, e.g., causing the system 100 to synchronize, e.g., interrupt handler/interrupt request (IRQ), e.g., controlling any radio(s) in the system. The GPS PPS signal can, e.g., define a synchronized timing interval, e.g., the beginning of a one second timing interval. When received, e.g., at a base station in block 102, can allow the system 100 to, e.g., do interrupt timer synchronizing in block 104, whereby, e.g., multiple transmit (Tx) and receive (Rx) time slots can be established for a given interval, e.g., one second until the next GPS PPS (in actuality, there will be up to several hundred per second), in block 106. Another GPS PPS pulse may be received in block 102' and the process repeated, e.g., essentially every second. The Tx and Rx cycles can thus be synchronized for all radios in and in communication with the respective base station.

Figure 4:
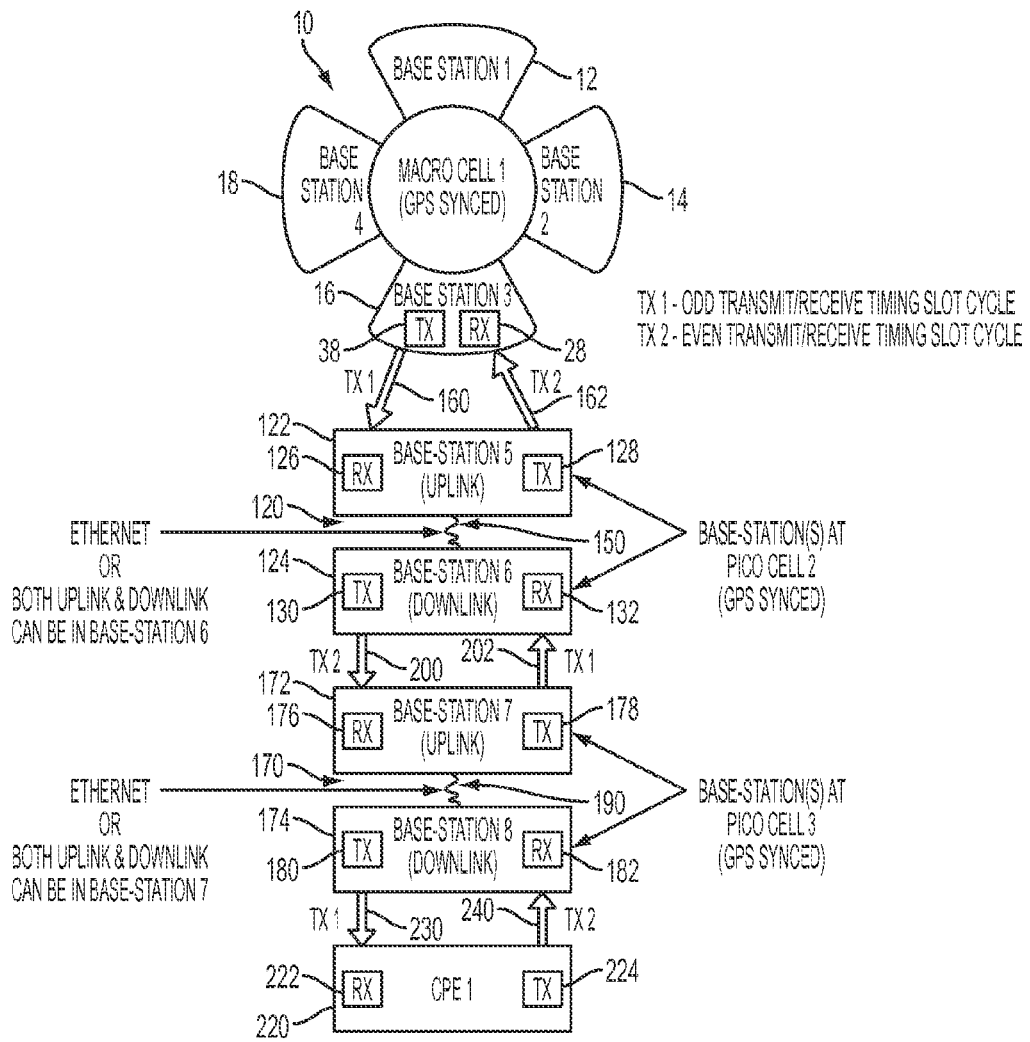
FIG. 4 illustrates, schematically and partly in block diagram format, 4 base-stations (labeled Base-Station 1-4) at a macro cell and also shows packet transmission timing coordination from base-station 3 down a network leg consisting of pico cells 2 & 3 to CPE 1, and the return path, including timing coordination back to base-station 3, according to aspects of embodiments of the disclosed subject matter.

FIG. 4 illustrates, schematically and partly in block diagram format, 4 base-stations (labeled Base-Station 1-4) at a Macro Cell and also shows packet transmission timing coordination from base-station 3 down a network leg consisting of Pico cells 2 & 3 to CPE 1, and the return path, including timing coordination back to base-station 3, according to aspects of embodiments of the disclosed subject matter. As illustrated by way of example in FIG. 4, the CPE 1 220 to Base-station 3 16 uplink/downlink 116, includes a pico cell 2, 120, including pico cell 120 uplink base station 5, 122 and pico cell 120 downlink base station 6, 124. Within the base-stations 5 and 6 can be a pico cell 120 uplink base station 5, 122, receiver (RX) 126, a pico cell 120 uplink base station 5, 122, transmitter (TX) 128, a pico cell 120 downlink base station 6, 124, transmitter (TX) 130 and a pico cell 120 uplink base station 5, 122, receiver (RX) 132, with the base-stations 5, 122. and 6, 124 connected by a network connection cable, e.g., an ethernet cable 150. A transmit channel TX 1 160, utilizing an odd transmit/receive timing slot cycle connects transmitter 38 in base station 3, 16 to receiver 126 in base station 5, 122 and a transmit channel TX2, 162, utilizing an even transmit/receive timing slot cycle, connects transmitter 128 in base-station 5, 122 to receiver 28 in base station 3, 16. A pico cell 3, 170 can include a pico cell 170 uplink base station 7, 172, a pico cell 170 downlink base station 8, 174, with each respectively including a pico cell 170 uplink base station 7, 172, receiver (RX) 176, pico cell 170 uplink base station 7, 172, transmitter (TX) 178, a pico cell 170 downlink base station 8, 174, transmitter (TX) 180 and a pico cell 170 downlink base station 8, 174, receiver (RX) 182. A network connection cable, e.g., an ethernet cable 190 can connect base-station 7, 172 and base-station 8, 174. A TX 2 channel 200 can exist between TX 130 and RX 176 and a TX 1 channel 202 can exist between TX 178 and TX 132, each respectively utilizing an odd transmit/receive timing slot cycle and an even transmit/receive timing slot cycle.

Customer premises equipment, CPE 1, 220, can include a CPE 1, 220, receiver (RX) 222 and a CPE 1, 220, transmitter (TX) 224, with a TX 1 channel 230 between TX 180 and RX 222 and TX 2 channel 240 between TX 224 and RX 182.

FIG. 4 illustrates, by way of example, 4 base-stations (labeled Base-Station 1-4, 12, 14, 16, 18) at a Macro Cell 10 and illustrates further packet transmission timing coordination from base-station 3, 16, down a network leg consisting of Pico cells 2, 120 and 3, 170, to CPE 1, 220, and the return path timing coordination back to base-station 3, 16. The timing coordination of each wireless link is depicted by TX1 and TX2, respectively 160, 162, 202, 200 and 230, 240. These can be utilizing alternating time slots 1 "Odd" and 2 "Even" that the radios will transmit/receive during. The option of GPS sync would allow coordination of multiple base-stations in a Macro/Pico Cell 10 as well as with adjacent Macro/Pico Cells 120, 170, etc.

Figure 5:
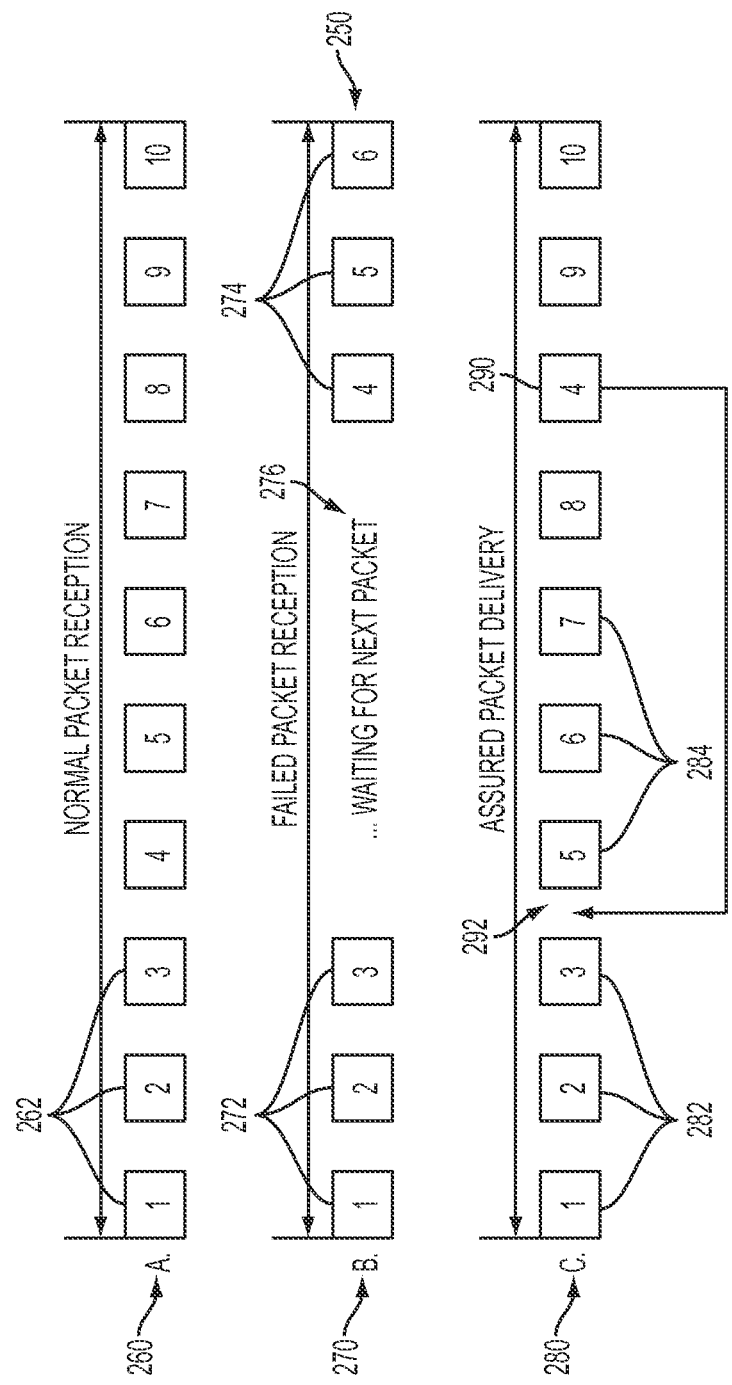
FIG. 5 illustrates, schematically and partly in block diagram format, assured packet delivery according to aspects of the disclosed subject matter, including, illustratively, 3 different packet reception scenarios, according to aspects of embodiments of the disclosed subject matter.

FIG. 5 illustrates, as an example, schematically and partly in block diagram format, assured packet delivery according to aspects of the disclosed subject matter, including, illustratively, 3 different packet reception scenarios. FIG. 5 illustrates by way of example, packet delivery sequences 250. A normal packet delivery and reception sequence 260 can include the correct reception of sequential packets 262, e.g., packets numbered 1-10. A failed packet delivery and reception sequence 270 can include the correct reception of sequential packets 272, e.g., 1-3 and a latency period 276 while the system waits for the dropped packet, e.g., 4, to be resent and received, followed then by more sequential packets 274, e.g., 4-6, which may be all that can be received, e.g., within a given reception window at the receiver, which by way of example only is illustrated here as being ten, but more likely will be much more than ten. An assured packet delivery and reception sequence 280 can include sequential packets 282, followed by a dropped packet, e.g., number 4, having a dropped packet slot 292, followed by continued delivery and correct reception of further sequential packets 284, e.g., numbers 5-8, until an out of order packet 290, e.g., comprising the missing packet 290, i.e., for the missing packet slot 292, into which the system can place the packet, e.g., number 4, to create a correct ordered sequence of packets, e.g., up to packet 10.

FIG. 5 illustrates examples of different packet reception scenarios. As noted, normal packet reception is where packets arrive on time as expected without any dropped packets. Also, as noted failed packet reception occurs when a packet is dropped and, as is common in the art, no additional packets are accepted until the dropped packet is re-sent, arrives and correctly received, thus creating unwanted latency, reducing the overall transmission rate. Assured Packet Delivery according to aspects of the disclosed subject matter, which as noted above, may, e.g., utilize transmit and/or receive delay buffers, allowing for essentially immediate packet retransmission, reception and reinsertion in the appropriate place in the packet sequence, in the event of a dropped packet, e.g., before the entire packet sequence is sent on to its next destination.

Figure 6:
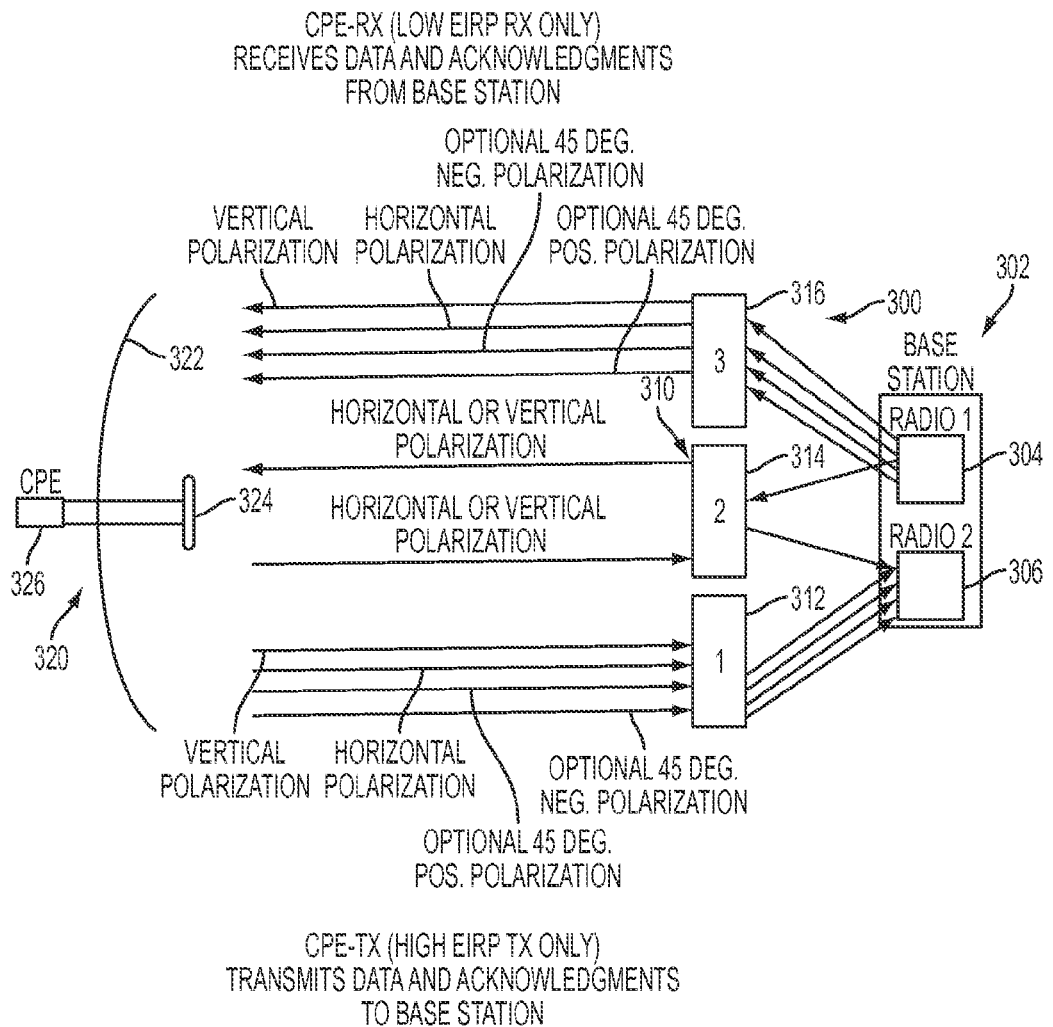
FIG. 6 illustrates, schematically and partly in block diagram format, how 2 radios inside a base-station may be attached in a 2×3 MIMO configuration to polarized sector or omni antennas to transmit and receive data packets between a CPE and the base-station, according to aspects of embodiments of the disclosed subject matter.

FIG. 6 illustrates, schematically and partly in block diagram format, how 2 radios inside a base-station may be attached to a multiple polarity sector or omni antenna to transmit and receive data packets between a CPE and the base-station, according to aspects of embodiments of the disclosed subject matter. FIG. 6 shows, by way of example, a base station to CPE link 300, wherein, e.g., the CPE 320 can receive, e.g., data and acknowledgements, from a Radio 1, 304, in the base station 302, through sector 3, 316, of antenna array 310, only in the low EIRP frequency band and can transmit, e.g., data and acknowledgements, to a Radio 2, 306, in the base station 302, through sector 1, 312 of the antenna array 310, only in the high EIRP power band, and each using the polarizations noted above. Radio 1, 304, e.g., can also transmit to the CPE 320 through a sector 2, 314, of the antenna array 310 and Radio 2, 306, can receive through sector 2, 314, from the CPE 320, each using either horizontal or vertical polarizations.

By way of example, according to aspects of the disclosed subject matter, FIG. 6 shows how the 2 radios 304, 306 inside a base-station 302 may be attached to the 2 or 3 polarized sector or omni antenna 310, illustrated as a three sector antenna, 312, 314, 316, e.g., to transmit and receive data packets between the CPE 320 and base-station 302. The polarizations of each chain are shown and FIG. 6 also illustrates as an example, how 2×3 MIMO can be achieved as well as how the base-station 302 can utilize, e.g., FDMA. The arrows pointing from the base-station 302 to the CPE 320 are transmit streams in a low power frequency band and the arrows pointing from the CPE 320 to the base station 302 are transmit streams in a high power frequency band. The antenna sectors 312, 314, 316 may be dual polarity as shown or they may be single polarity antennas, in which case additional antennas may be required.

FIG. 7 illustrates, e.g., schematically and partly in block diagram format, the signal polarization and radio configuration of a CPE device 320, according to aspects of embodiments of the disclosed subject matter. FIG. 7 illustrates, as an example, how the signal polarization and radio configuration of a CPE device 320 can be arranged. The CPE 320 can consist of 2 radios 330, 340 which can, e.g., allow the CPE to run at full duplex, e.g., in FDMA mode, both transmitting and receiving simultaneously on different frequencies, respectively in the high EIRP frequency band for transmission by Radio 1, 340, and receiving in the low EIRP power frequency band for Radio 2, 330. The CPE 320 could, therefore, receive data and acknowledgements in the lower EIRP frequency band via Radio 2, 330 and transmit data and acknowledgements back to the base-station in a higher EIRP frequency band through Radio 1 340. Of course, it will be understood by those skilled in the art that the two radios, i.e., Radio 1, 340 in the CPE 320 and Radio 2, 330 in the CPE 320, as well as Radio 1, 304 and Radio 2, 306 in the base-station 302, operating in FDMA mode, i.e., each transmitting and receiving respectively on different frequencies, and/or utilizing FDD, can be a single radio containing a transmitter and a receiver. The single radio operating in FDMA can have, respectively, a transmitter of the single radio doing the transmitting and a receiver of the single radio doing the receiving, each on different frequencies, and/or utilizing FDD.

It will be understood by those skilled in the art that by transmitting in, e.g., the unlicensed 5 GHz UNII-2 & UNII-2e radio band, which in the US is considered a "low power" frequency band, according to aspects of the disclosed subject matter a large amount of transmission power can be conserved, e.g., up to about 22 dBi better base station receive signal at about 10 miles from the transmitting CPE, i.e., experiencing about a 131.4 dB free space loss. It will be recognized by those in the art that, by way of example, the CPE receive signal is equal to the base-station (AP) transmit power ($\sim$=13 dBm) plus the base-station (AP) transmit antenna gain, ($\sim$=17 dBi), together $\sim$=30 dBm, plus the CPE receive antenna gain ($\sim$=29 dBi) less that free space path loss of 131.4 dB, which equals −72.4 dBm. This is with the base-station transmitting in the low power UNII-2 & UNII-2e bands in either 5.3 or 5.5 GHz, so that the same numbers apply for aspects of the subject matter of this application also transmitting from the base-station to the CPE in the UNII-2 & UNII-2e low power bands.

However for the transmission from the CPE to the base-station, the base-station receive signal strength is improved by 22 dB with the CPE transmitting in the high EIRP UNII-3/ISM frequency band. For the traditional system, with the CPE also transmitting in the UNII-2 & UNII-2e low power frequency bands, as does the base-station in the traditional system, the base-station receive signal strength is equal to the CPE transmit power ($\sim$=1 dB) plus the CPE transmit antenna gain ($\sim$=29 dB), together $\sim$=30 dB, which for the traditional system transmitting between the base-station and CPE, and vice-versa, is the FCC limit for transmission power in the UNII-2 & UNII-2e bands, plus the base station receive antenna gain ($\sim$=17 dB), minus 131.4 dB free space path loss, which is equal to −84.4 dB. However, for the base station according to aspects of the disclosed subject matter, with the CPE transmitting in the UNII-3/ISM high EIRP frequency band, the base station received signal strength is improved to −62.4 dB, that is the CPE transmit power is able to be increased ($\sim$=23 dB), an improvement of 22 dB, in the UNII-3/ISM high EIRP band at, about 5.8 GHz, plus the CPE transmit antenna gain ($\sim$=29 dB), together an improved 52 dB, not regulated by the FCC in the UNII-3/ISM frequency band, and minus the 131.4 dB, which equals the improved −62.4 dB.

The following is a disclosure by way of example of a computing device which may be used with the presently disclosed subject matter. The description of the various components of a computing device is not intended to represent any particular architecture or manner of interconnecting the components. Other systems that have fewer or more components may also be used with the disclosed subject matter. A communication device may constitute a form of a computing device and may at least include, contain, utilize or emulate a computing device. The computing device may include an interconnect (e.g., bus and system core logic), which can interconnect such components of a computing device to a data processing device, such as a processor(s) or a microprocessor(s) or a controller(s), or other form of partly or completely programmable or pre-programmed device, e.g., hard wired and/or application specific integrated circuit ("ASIC") customized logic circuitry, such as may implement, e.g., a controller or microcontroller, a digital signal processor, or any other form of device that can fetch and perform instructions, operate on pre-loaded/pre-programmed instructions, and/or follow instructions found in hard-wired or customized circuitry, such as above noted forms of hard-wired circuitry containing logic circuitry, in order to carry out logic operations that, together, perform steps of and whole processes and functionalities as described in the present disclosure.

In this description, various functions, functionalities and/or operations may be described as being performed by or caused by software program code to simplify description. However, those skilled in the art will recognize that what is meant by such expressions is that the functions resulting from execution of the program code/instructions are performed by a computing device as described in the present application, e.g., including a processor, such as a microprocessor, microcontroller, logic circuit or the like noted above. Alternatively, or in combination, the functions and operations can be implemented using special purpose circuitry, with or without software instructions, such as using an Application-Specific Integrated Circuit(s) (ASIC) or a Field-Programmable Gate Array(s) (FPGA), which may be programmable, partly programmable or hard wired. The application specific integrated circuit ("ASIC") logic may be such as gate arrays or standard cells, or the like, implementing customized logic by metallization(s) interconnects of the base gate array ASIC architecture or selecting and providing metallization(s) interconnects between standard cell functional blocks included in a manufacturer's library of functional blocks, etc. Embodiments can thus be implemented using hard wired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device, such as a tangible machine readable medium. In other words, as an example only, part or all of the machine readable medium may in part or in full form a part of the, or be included within the computing device itself, e.g., as the above noted hard wiring or pre-programmed instructions in any memory utilized by or in the computing device.

While some embodiments can be implemented in fully functioning computers and computer systems, various embodiments are capable of being distributed as a computing device including, e.g., a variety of architecture(s), form(s) or component(s). Embodiments may be capable of being applied regardless of the particular type of machine or tangible machine/computer readable media used to actually affect the performance of the functions and operations and/or the distribution of the performance of the functions, functionalities and/or operations.

The interconnect may connect the data processing device to defined logic circuitry including, e.g., a memory. The interconnect may be internal to the data processing device, such as coupling a microprocessor to on-board cache memory, or external (to the microprocessor) memory such as main memory, or a disk drive, or external to the computing device, such as a remote memory, a disc farm or other mass storage device(s), etc. Commercially available microprocessors, one or more of which could be a computing device or part of a computing device, include a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation, as examples.

The inter-connect in addition to interconnecting such as microprocessor(s) and memory may also interconnect such elements to a display controller and/or display device, and/or to other peripheral devices such as an input/output (I/O) device(s), e.g., through an input/output controller(s). Typical I/O devices can include a mouse, a keyboard(s), a modem(s), a network interface(s), a printer(s), a scanner(s), a digital or video camera(s) and other devices which are well known in the art. The interconnect may include one or more buses connected to one another through various forms of a bridge(s), a controller(s) and/or an adapter(s). In one embodiment an I/O controller may include a USB (Universal Serial Bus) adapter for controlling a USB peripheral(s), and/or an IEEE-1394 bus adapter for controlling an IEEE-1394 peripheral(s).

The storage device, i.e., memory may include any tangible machine readable media, which may include but are not limited to recordable and non-recordable type media such as a volatile or non-volatile memory device(s), such as volatile RAM (Random Access Memory), typically implemented as a dynamic RAM (DRAM) which requires power continually in order to refresh or maintain the data in the memory, and a non-volatile ROM (Read Only Memory), and other types of non-volatile memory, such as a hard drive, flash memory, detachable memory stick, etc. Non-volatile memory typically may include a magnetic hard drive, a magnetic/optical drive, or an optical drive (e.g., a DVD RAM, a CD ROM, a DVD or a CD), or other type of memory system which maintains data even after power is removed from the system.

A server could be made up of one or more computing devices. A server can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with another computing device(s) positioned locally or remotely to execute instructions, e.g., to perform certain algorithms, calculations and other functions as may be included in the operation of the system(s) and method(s) of the disclosed subject matter, as disclosed in the present application.

At least some aspects of the disclosed subject matter can be embodied, at least in part, in programmed software code/instructions. That is, the functions, functionalities and/or operations and techniques may be carried out in a computing device or other data processing system in response to its processor, such as a microprocessor, executing sequences of instructions contained in a memory or memories, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as a "computer program(s)," or "software." The computer program(s) typically comprise instructions stored at various times in various tangible memory and storage devices, e.g., in a computing device, such as in cache memory, main memory, internal disk drives, and/or above noted forms of external memory, such as remote storage devices, such as a disc farm, remote memory or databases, e.g., accessed over a network, such as the Internet. When read and executed by a computing device, e.g., by a processor(s) in the computing device, the computer program causes the computing device to perform a method(s), e.g., process and operation steps to execute an element(s) as part of some aspect(s) of the system(s) or method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations as noted above. Further, the program software code/instructions can be obtained from remote storage, including, e.g., through centralized servers or peer to peer networks and the like. Different portions of the software program code/instructions and data can be obtained at different times and in different communication sessions or in a same communication session, e.g., with one or many storage locations.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways may be used for obtaining the software program code/instructions and data may occur, as an example, for different applications, components, programs, objects, modules, routines or other sequences of instructions or organization of sequences of instructions. Thus, it is not required that the data and instructions be on a single machine readable medium in entirety at any particular instant of time or at any instant of time ever.

In general, a tangible machine readable medium can include any tangible mechanism that provides (i.e., stores) information in a form accessible by a machine (e.g., a computing device), which may be included, e.g., in a communication device, a network device, a personal digital assistant, a mobile communication device, whether or not able to download and run applications from the communication network, such as the Internet, e.g., an iPhone®, Blackberry®, Droid®, or the like, a manufacturing tool, or any other device including a computing device, comprising, e.g., one or more data processors, etc. In an embodiment(s), a user terminal can be a computing device, such as in the form of or included within a PDA, a cellular phone, a notebook computer, a personal desktop computer, etc. Alternatively, any traditional communication client(s) may be used in some embodiments of the disclosed subject matter. While some embodiments of the disclosed subject matter have been described in the context of fully functioning computing devices and computing systems, those skilled in the art will appreciate that various embodiments of the disclosed subject matter are capable of being distributed, e.g., as a system, method and/or software program product in a variety of forms and are capable of being applied regardless of the particular type of computing device machine or machine readable media used to actually effect the distribution.

The disclosed subject matter may be described with reference to block diagrams and operational illustrations or methods and devices to provide the system(s) and/or method(s) according to the disclosed subject matter. It will be understood that each block of a block diagram or other operational illustration (herein collectively, "block diagram"), and combination of blocks in a block diagram, can be implemented by means of analog or digital hardware and computer program instructions. These computing device software program code/instructions can be provided to the computing device such that the instructions, when executed by the computing device, e.g., on a processor within the computing device or other data processing apparatus, the program software code/instructions cause the computing device to perform functions, functionalities and operations of the system(s) and/or method(s) according to the disclosed subject matter, as recited in the accompanying claims, with such functions, functionalities and operations specified in the block diagram.

It will be understood that in some possible alternate implementations, the function, functionalities and operations noted in the blocks of a block diagram may occur out of the order noted in the block diagram. For example, the function noted in two blocks shown in succession can in fact be executed substantially concurrently or the functions noted in blocks can sometimes be executed in the reverse order, depending upon the function, functionalities and operations involved. Therefore, the embodiments of the system(s) and/or method(s) presented and described as a flowchart(s) in the form of a block diagram in the present application are provided by way of example only, and in order to provide a more complete understanding of the disclosed subject matter. The disclosed flow and concomitantly the method(s) performed as recited in the accompanying claims are not limited to the functions, functionalities and operations illustrated in the block diagram(s) and/or logical flow(s) presented in the disclosed subject matter. Alternative embodiments are contemplated in which the order of the various functions, functionalities and operations may be altered and in which sub-operations described as being part of a larger operation may be performed independently or performed differently than illustrated or not performed at all.

Although some of the drawings may illustrate a number of operations in a particular order, functions, functionalities and/or operations which are not now known to be order dependent, or become understood to not be order dependent, may be reordered. Other functions, functionalities and/or operations may be combined or broken out. While some reordering or other groupings may have been specifically mentioned in the present application, others will be or may become apparent to those of ordinary skill in the art and so the disclosed subject matter does not present an exhaustive list of alternatives. It should also be recognized that the aspects of the disclosed subject matter may be implemented in parallel or seriatim in hardware, firmware, software or any combination(s) of these, co-located or remotely located, at least in part, from each other, e.g., in arrays or networks of computing devices, over interconnected networks, including the Internet, and the like.

CONCLUSION

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A subscriber station device, comprising:
    a directional antenna;
    a first radio connected to the directional antenna transmitting data or acknowledgements in a first high equivalent isotropically radiated power regulated frequency band;
    a second radio connected to the directional antenna receiving data or acknowledgements in a second, different low equivalent isotropically radiated power regulated frequency band;
    one or more media access controllers configured to control said first radio and said second radio; and
    one or more media independent Ethernet interfaces in bidirectional communication with said first radio and said second radio.

2. The subscriber station device of claim 1 further comprising:
    wherein the one or more media access controllers are configured to prevent the subscriber station device from transmitting data or acknowledgements whenever the subscriber station device is receiving data or acknowledgements.

3. The subscriber station device of claim 1 further comprising:
    a filter on the receiving radio of the subscriber station device filtering out the frequency at which the subscriber station device is transmitting data or acknowledgements.

4. The subscriber station device of claim 1 further comprising:
    wherein the radios have multiple input and multiple output capabilities.

5. The subscriber station device of claim 1 further comprising:
    wherein the one or more media access controllers adjust subscriber station transmit power according to information received from a base station.

6. The subscriber station device of claim 1 further comprising:
    wherein the one or more media access controllers are configured to set the subscriber station transmit and receive channel widths, independently of each other.

7. The subscriber station device of claim 2 further comprising:
    wherein the one or more media access controllers utilize a plurality of pre-determined transmit and receive windows established for the media access controller to define a respective time when the subscriber station device is permitted to transmit, which is exclusive of any pre-determined receive time when the subscriber station device is permitted to receive.

8. The subscriber station device of claim 7 further comprising:
    the plurality of pre-determined transmit and receive windows being determined from information received from a base-station in communication with the subscriber station.

9. The subscriber station device of claim 7 further comprising:
    the plurality of pre-determined transmit and receive windows having been determined by a base-station in communication with the subscriber station.

10. The subscriber station device of claim 9 further comprising:
    the plurality of pre-determined transmit and receive windows having been determined by the base-station based on a time standard periodically supplied to the base station device.

11. A base-station device comprising:
    one or more antennas;
    a first radio connected to the one or more antennas transmitting data and acknowledgements in a first low equivalent isotropically radiated power regulated frequency band;
    a second radio connected to the antennas receiving data and acknowledgements in a second, different high equivalent isotropically radiated power regulated frequency band;
    one or more media independent Ethernet interfaces in bidirectional communication with said first radio and said second radio; and
    wherein said first radio may transmit data and acknowledgements while said second radio receives data and acknowledgements simultaneously.

12. The base-station device of claim 11 further comprising:
    wherein the one or more media access controllers prevent the base-station device from transmitting data or acknowledgements to a CPE whenever the base-station device is receiving data or acknowledgements from the same CPE.

13. The base-station device of claim 11 further comprising:
    a filter on the receiving radio of the base-station device filtering out the frequency at which the base-station device is transmitting data or acknowledgements.

14. The base-station device of claim 11 further comprising:
    the base-station radios having multiple input and multiple output capabilities.

15. The base-station device of claim 11 further comprising:
    wherein the one or more media access controllers are configured to provide information to a subscriber station for adjusting the subscriber station transmit power.

16. The base-station device of claim 11 further comprising:
    wherein the one or more media access controllers are configured to set the base-station transmit and receive channel widths independently of each other.

17. The base-station device of claim 12 further comprising:
    wherein the one or more media access controllers are configured to create a plurality of pre-determined transmit and receive windows.

18. The base-station device of claim 17 further comprising:
    wherein the one or more media access controllers are configured to create the plurality of pre-determined transmit and receive windows based on a time standard periodically received by the base-station device.

19. The base-station device of claim 11 further comprising:
    the second radio receiving a signal from a customer premise equipment transmitter transmitting in the second, different high equivalent isotropically radiated power regulated frequency band.

20. A method of operating a subscriber station device, comprising:

providing a directional antenna;
transmitting on a first radio connected to the directional antenna, data or acknowledgements in a first high equivalent isotropically radiated power regulated frequency band;
receiving on a second radio connected to the directional antenna, data or acknowledgements in a second, different low equivalent isotropically radiated power regulated frequency band;
providing media access control for controlling said first radio and said second radio; and
utilizing one or more media independent Ethernet interfaces in bidirectional communication with said first radio and said second radio.

21. The method of claim 20 further comprising:
preventing the subscriber station device from transmitting data or acknowledgements whenever the subscriber station device is receiving data or acknowledgements.

22. The method of claim 20 further comprising:
filtering out the frequency at which the subscriber station device is transmitting data or acknowledgements, using a filter on the subscriber station device receiving radio.

23. The method of claim 20 further comprising:
providing said media access control, utilizing a plurality of pre-determined transmit and receive windows, established to define a respective time when the subscriber station device is permitted to transmit, which is exclusive of any pre-determined receive time when the subscriber station device is permitted to receive.

24. The method of claim 23 further comprising:
the plurality of pre-determined transmit and receive windows being received from a base-station in communication with the subscriber station.

25. The method of claim 24 further comprising:
the plurality of pre-determined transmit and receive windows having been determined based on a time standard periodically supplied to the base-station device.

26. The method of claim 20 further comprising:
connecting antennas and radios together in a way as to achieve multiple inputs and multiple outputs.

27. The method of claim 20 further comprising:
receiving power level information from a base-station in communication with the subscriber station and adjusting the subscriber station transmit power.

28. The method of claim 20 further comprising:
setting subscriber station transmit and receive channel widths independently of each other.

29. A method of operating a base-station device comprising:
providing one or more antennas;
transmitting data or acknowledgments on a first radio connected to the one or more antennas, in a first low equivalent isotropically radiated power regulated frequency band;
receiving data and acknowledgements on a second radio connected to the one or more antennas, in a second, different high equivalent isotropically radiated power regulated frequency band;
providing media access control for controlling said first radio and said second radio;
utilizing one or more media independent Ethernet interfaces in bidirectional communication with said first radio and said second radio; and
wherein said first radio may transmit data and acknowledgements while said second radio receives data and acknowledgements simultaneously.

30. The method of claim 29 further comprising:
preventing the base-station device from transmitting data or acknowledgements to a CPE whenever the base-station device is receiving data or acknowledgements from the same CPE.

31. The method of claim 29 further comprising:
filtering out the frequency at which the base-station device is transmitting data or acknowledgements, utilizing a filter on the base-station device receiving radio.

32. The method of claim 29 further comprising:
utilizing the one or more media access controllers to create a plurality of pre-determined transmit and receive windows.

33. The method of claim 31 further comprising:
creating the plurality of pre-determined transmit and receive windows based on a time standard periodically supplied to the base-station.

34. The method of claim 29 further comprising:
the second radio receiving a signal from a subscriber station transmitter transmitting in the high equivalent isotropically radiated power regulated frequency band.

35. The method of claim 29 further comprising:
connecting antennas to radios to achieve multiple inputs and multiple outputs.

36. The method of claim 29 further comprising:
transmitting receive power level information to a subscriber-station device in communication with the base-station device.

37. The method of claim 29 further comprising:
setting the transmit and receive channel widths of the base station device independently of each other.

38. A tangible non-transitory machine readable medium storing instructions that, when executed by a computing device, cause the computing device to perform a method of operating a subscriber station device, the method comprising:
controlling a first radio connected to a directional antenna in the subscriber station to transmit data or acknowledgements in a first high equivalent isotropically radiated power regulated frequency band;
controlling a second radio connected to the directional antenna in the subscriber station to receive data or acknowledgements in a second, different low equivalent isotropically radiated power regulated frequency band;
controlling one or more media access controllers for controlling said first radio and said second radio; and
utilizing one or more media independent Ethernet interfaces in bidirectional communication with said first radio and said second radio.

39. A tangible non-transitory machine readable medium storing instructions that, when executed by a computing device, cause the computing device to perform a method of operating a base-station device, the method comprising:
controlling a first radio in the base-station to transmit data or acknowledgements in a first low equivalent isotropically radiated power regulated frequency band;
controlling a second radio in the base station to receive data or acknowledgements in a second, different high equivalent isotropically radiated power regulated frequency band;
controlling one or more media access controllers for controlling said first radio and said second radio;
utilizing one or more media independent Ethernet interfaces in bidirectional communication with said first radio and said second radio; and wherein said first radio may transmit data and acknowledgements while said second radio receives data and acknowledgements simultaneously.

40. A tangible non-transitory machine readable medium storing instructions that, when executed by a computing device, cause the computing device to perform a method, the method comprising:
transmitting data or acknowledgements by a first radio in a first low equivalent isotropically radiated power regulated frequency band;
receiving data or acknowledgements by a second radio in a second, different high equivalent isotropically radiated power regulated frequency band;
providing one or more media access controllers to control said first radio and said second radio;
utilizing one or more media independent Ethernet interfaces in bidirectional communication with said first radio and said second radio; and
wherein said first radio may transmit data and acknowledgements while said second radio receives data and acknowledgements simultaneously.

41. A tangible non-transitory machine readable medium storing instructions that, when executed by a computing device, cause the computing device to perform a method, the method comprising:
receiving data or acknowledgements by a first radio in a first low equivalent isotropically radiated power regulated frequency band;
transmitting data or acknowledgements by a second radio in a second, different high equivalent isotropically radiated power regulated frequency band;
providing one or more media access controllers to control said first radio and said second radio;
utilizing one or more media independent Ethernet interfaces in bidirectional communication with said first radio and said second radio; and
wherein said second radio may transmit data and acknowledgements while said first radio receives data and acknowledgements simultaneously.

42. A subscriber station device, comprising:
a directional antenna;
a radio connected to the directional antenna transmitting data or acknowledgements in a first high equivalent isotropically radiated power regulated frequency band;
the radio connected to the directional antenna receiving data or acknowledgements in a second, different low equivalent isotropically radiated power regulated band;
one or more media access controllers to control said radio; and
one or more media independent Ethernet interfaces in bidirectional communication with said radio.

43. A base-station device, comprising:
one or more antennas;
a radio connected to the one or more antennas transmitting data or acknowledgements in a first low equivalent isotropically radiated power regulated frequency band;
the radio connected to the one or more antennas receiving data or acknowledgements in a second, different high equivalent isotropically radiated power regulated band, said radio configured to simultaneously transmit in said first low equivalent isotropically radiated power regulated frequency band and receive in said second, different high equivalent isotropically radiated power regulated band;
one or more media access controllers to control said radio; and
one or more media independent Ethernet interfaces in bidirectional communication with said radio.

44. A communications device, comprising:
a directional antenna;
a radio connected to the directional antenna transmitting data or acknowledgements in a first high equivalent isotropically radiated power regulated frequency band;
the radio connected to the directional antenna receiving data or acknowledgements in a second, different low equivalent isotropically radiated power regulated band;
one or more media access controllers to control said radio; and
one or more media independent Ethernet interfaces in bidirectional communication with said radio.

45. A communications device, comprising:
one or more antenna;
a radio connected to the one or more antennas transmitting data or acknowledgements in a first low equivalent isotropically radiated power regulated frequency band;
the radio connected to the one or more antennas receiving data or acknowledgements in a second, different high equivalent isotropically radiated power regulated band, said radio configured to simultaneously transmit in said first low equivalent isotropically radiated power regulated frequency band and receive in said second, different high equivalent isotropically radiated power regulated band;
one or more media access controllers to control said radio; and
one or more media independent Ethernet interfaces in bidirectional communication with said radio.

46. A subscriber station device, comprising:
a directional antenna;
a transmitter connected to the directional antenna transmitting data or acknowledgements in a first high equivalent isotropically radiated power regulated frequency band;
a receiver connected to the directional antenna receiving data or acknowledgements in a second, different low equivalent isotropically radiated power regulated band;
one or more media access controllers to control said transmitter and said receiver; and
one or more media independent Ethernet interfaces in bidirectional communication with said transmitter and said receiver.

47. A base-station device, comprising:
one or more antennas;
a transmitter connected to the one or more antennas transmitting data or acknowledgements in a first low equivalent isotropically radiated power regulated frequency band;
a receiver connected to the one or more antennas receiving data or acknowledgements in a second, different high equivalent isotropically radiated power regulated band, said transmitter and said receiver configured to simultaneously transmit in said first low equivalent isotropically radiated power regulated frequency band and receive in said second, different high equivalent isotropically radiated power regulated band;
one or more media access controllers to control said transmitter and receiver; and
one or more media independent Ethernet interfaces in bidirectional communication with said transmitter and said receiver.

48. A base-station device, comprising:
a transmitter connected to one or more antennas transmitting data or acknowledgements in a first low equivalent isotropically radiated power regulated frequency band;
a receiver connected to one or more antennas receiving data or acknowledgements in a second, different high equivalent isotropically radiated power regulated band, said transmitter and receiver configured to simultaneously transmit in said first low equivalent isotropically radiated power regulated frequency band and receive in said second, different high equivalent isotropically radiated power regulated band;
one or more media access controllers to control said transmitter and said receiver; and
one or more media independent Ethernet interfaces in bidirectional communication with said transmitter and said receiver.

49. A subscriber station device, comprising:
a transmitter connected to a directional antenna transmitting data or acknowledgements in a first high equivalent isotropically radiated power regulated frequency band;
a receiver connected to a directional antenna receiving data or acknowledgements in a second, different low equivalent isotropically radiated power regulated band;
one or more media access controllers to control said transmitter and said receiver; and
one or more media independent Ethernet interfaces in bidirectional communication with said transmitter and said receiver.

* * * * *